United States Patent [19]

Dell'Acqua et al.

[11] Patent Number: 4,782,319

[45] Date of Patent: Nov. 1, 1988

[54] PRESSURE SENSOR

[75] Inventors: Roberto Dell'Acqua, Pavia; Giuseppe Dell'Orto; Gilberto Dendi, both of Milan, all of Italy

[73] Assignee: Marelli Autronica S.p.A., Pavia, Italy

[21] Appl. No.: 13,097

[22] Filed: Feb. 10, 1987

[30] Foreign Application Priority Data

Feb. 10, 1986 [IT] Italy ................................ 67097 A/86

[51] Int. Cl.4 ................................................. G01L 1/22
[52] U.S. Cl. ............................................ 338/4; 338/5;
338/42; 338/47
[58] Field of Search ................... 338/4, 5, 47, 114, 42;
73/725, 726, 727

[56] References Cited

U.S. PATENT DOCUMENTS 3,341,794  9/1967  Stedman ................................. 338/4
3,455,165  7/1969  Hut ......................................... 338/4
4,382,247  5/1983  Stecher et al. ......................... 338/42

Primary Examiner—Clifford C. Shaw
Assistant Examiner—M. M. Lateef
Attorney, Agent, or Firm—Sughrue, Mion, Zinn, Macpeak & Seas

[57] ABSTRACT

The sensor includes a rigid support and a diaphragm having a peripheral portion fixed by a layer of glue to the support. The central portion of the diaphragm is spaced from the support and, on its surface facing the support, carries at least one thick-film resistor acting as a piezo-resistive transducer. The diaphragm can deform resiliently towards the support when a pressure is exerted on its other surface. The surface of the support which is connected to the diaphragm is flat, and the layer of glue has a calibrated thickness such that the distance between the diaphragm and the surface of the support at rest is substantially equal to the deflection of the diaphragm corresponding to a predetermined maximum pressure measured.

2 Claims, 1 Drawing Sheet

PRESSURE SENSOR

BACKGROUND OF THE INVENTION

The present invention relates to a pressure sensor and more particularly to a sensor of the type comprising a rigid support and a diaphragm having a peripheral portion fixed by a layer of glue to the support and a central portion spaced from the support and carrying, on its surface facing the support, at least one thick-film resistor acting as a piezo-resistive transducer, the diaphragm being able to deform resiliently towards the support when a pressure is exerted on its other surface.

A pressure sensor of this type according to the prior art is shown in FIGS. 1 to 3 of the appended drawings. It includes, in known manner, a substantially circular rigid support 1, typically of ceramics material, having an annular projection 1a on its upper face. This projection surrounds a flat rebated surface 1b of the support (FIG. 2). The sensor further includes a diaphragm 2 constituted typically by a substantially circular disc of ceramics material having a thickness of the order of about 500 microns. This diaphragm has a peripheral portion fixed by a layer of glue 3 to the upper surface of the annular projection 1a of the support 1. Usually, both the diaphragm 2 and the projection 1a of the support 1 are provided with respective layers of vitreous glue deposited by silk screen printing, and the diaphragm and the support are then juxtaposed and passed through an oven so as to melt the layers of glue. Before the gluing step, there are deposited on the surface 2a of the diaphragm 2 intended to face the support 1, thick film resistors R for acting a piezo-resistive strain gauge transducers and conductive tracks (also deposited by silk screen printing by the thick-film technique) for their interconnection and their connection to external circuits.

In use, when a pressure is exerted on the diaphragm 2 in the manner indicated by the arrows indicated F in FIG. 3, the diaphragm 2 deforms elastically towards the support 1. The thick-film resistors R deform and consequently their resistances vary. This variation in resistance may be detected by external circuits of conventional type.

The pressure sensors of the type described above with reference to FIGS. 1 to 3 have the following problem. The dimensions of the diaphragm depend on the range of pressure values which are to be measured with the sensor. The diaphragm will be relatively thin for relatively low pressure ranges, while the diaphragm will generally have to be thicker to measure relatively higher pressures.

For some specific applications, it is necessary for the pressure sensor to be able to detect pressures within a predetermined range of measurements and also occasionally to be able to withstand very much higher pressures than the predetermined maximum pressure to be measured. For example, it may be necessary for a sensor to be able to measure pressures of between 0.5 and 2 bars, while, for safety reasons, it is necessary for the sensor to be able to withstand pressures of, for example, 10 bars. According to the prior art, the diaphragm of a pressure sensor intended to fulfil these requirements would be dimensioned so that it could withstand, that is, bend resiliently without breaking, a pressure of up to 10 bars. As a result of this dimensioning criterion, the sensor has a rather poor sensitivity in practice, that is, there is a relatively modest deformation of the diaphragm at predetermined pressure variations within the range of measurement proper, that is, for pressures of up to 5 bars.

The sensors of conventional type described above thus have the disadvantage of poor sensitivity in the range of pressure values to be measured when they have to be dimensioned so as to withstand occasional exceptional pressures of a much higher value than the maximum pressure to be measured.

SUMMARY OF THE INVENTION

The object of the present invention is to provide a pressure sensor of the aforesaid type which enables the disadvantage described above to be avoided.

This object is achieved according to the invention by means of a pressure sensor of the type specified above, the main characteristic of which lies in the fact that the surface of the support which is connected to the diaphragm is flat and the layer of glue has a calibrated thickness such that the distance between the diaphragm and the surface of the support at rest is substantially equal to the deflection of the diaphragm corresponding to the predetermined maximum pressure to be measured.

In the sensor according to the invention, therefore, the diaphragm can be dimensioned such that.it can withstand, that is, bend resiliently without breaking, pressures of up to substantially equal the maximum predetermined pressure to be measured or slightly higher values. When the pressure applied to the diaphragm of such a sensor surpasses the predetermined maximum pressure to be measured, the diaphragm is brought to bear against the surface of the support 1 facing it and can thus withstand the over-pressure.

Further characteristics and advantages of the pressure sensor of the invention will become apparent from the detailed description which follows, with reference to the appended drawings, provided purely by way of non-limiting example.

DETAILED DESCRIPTION OF THE INVENTION

Figure 1:
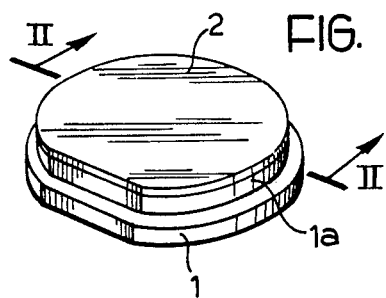
FIG. 1 already described, is a perspective view of a pressure sensor of the prior art, FIG. 2, already described, is a section taken on the line II—II of FIG. 1, FIG. 3, also described previously, is a view similar to FIG. 2.
Figure 2:
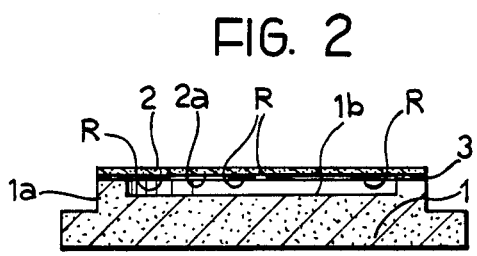
Figure 4:
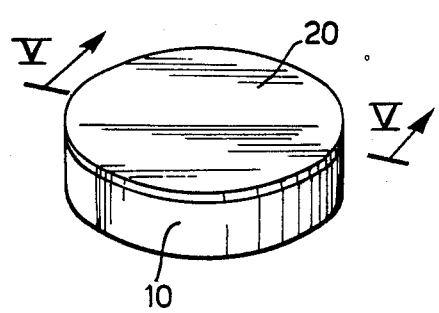
FIG. 4 is a perspective view of a pressure sensor of the invention.
Figure 3:
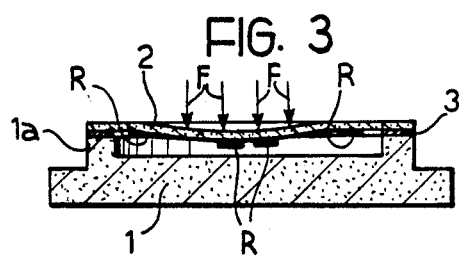
Figure 5:
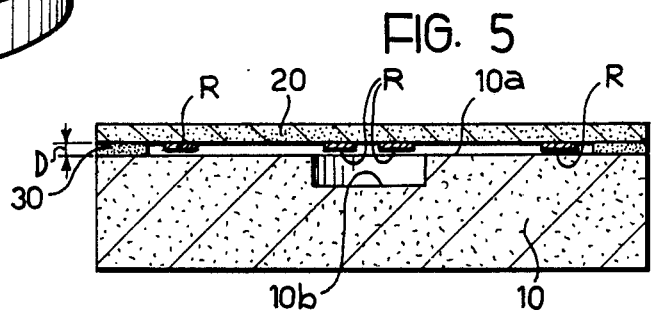
FIG. 5 is a sectional view taken on the line V—V of FIG. 4.
Figure 6:
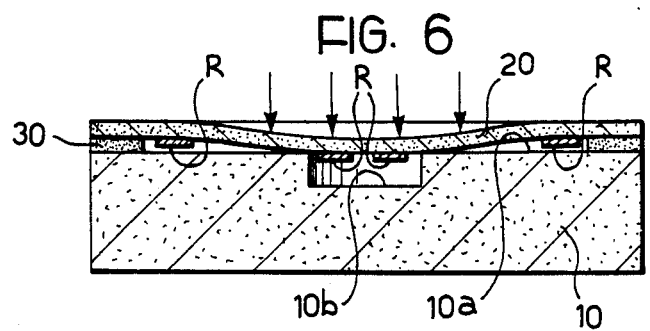
FIG. 6 is a section, similar to the view shown in FIG. 5, of a pressure sensor of the invention under conditions in which it is subject to a pressure greater than the predetermined maximum pressure to be measured.

With reference to FIGS. 4 and 5, the pressure sensor of the invention also includes a rigid support, indicated 10, constituted, for example, by a ceramics material, to which is fixed a diaphragm 20 also constituted, for example, by a thin disc of ceramics material. As shown in particular in FIG. 5, the upper surface 10a of the support 10 is flat. The diaphragm 20 is fixed to and supported from the support 10 by means of the interposition of an annular layer of glue 30. This layer of glue has a thickness D which is calibrated precisely so that the distance between the diaphragm 20 and the upper face 10a of the support 10 at rest is substantially equal to the deflection of the diaphragm 20 corresponding to the predetermined maximum pressure to be measured. Thus, for example, if the sensor is intended to measure pressures of up to 5 bars, the thickness of the glue is calibrated so that the rest distance between the diaphragm 20 and the surface 10a of the support 10 is equal to the deflection of the diaphragm when it is subject to a pressure of 5 bars. If a pressure of 10 bars is exerted on the diaphragm 20, for example, the diaphragm is brought into contact with the surface 10a of the support 10, as shown in FIG. 6, and discharges the forces on the support 10. Thus, the sensor is in practice able to withstand pressures of up to a value which the support 10 itself can withstand.

The rest distance between the diaphragm and the support may be calibrated very precisely by controlling the thickness of the layer of glue deposited by silk screen printing on the diaphragm and the support. Typically, the rest distance between the diaphragm and the support is of the order of 10 microns.

Conveniently, though not necessarily, as shown in FIGS. 5 and 6, a rebate 10b is formed in the surface 10a of the support 10 facing the thick-film resistors R carried centrally by the diaphragm 20. Thus, as shown in FIG. 6, when the sheet or diaphragm 20 is brought to bear against the support, damage to the thick-film resistors, which could result from their impact with the support, is avoided.

Naturally, the principle of the invention remaining the same, the forms of embodiment and details of construction may be varied widely with respect to that described and illustrated purely by way of non-limiting example, without thereby departing from the scope of the present invention.

We claim:

1. Pressure sensor comprising a rigid support, a diaphragm having a peripheral portion fixed by a layer of glue to the support and a central portion spaced from the support, and at least one thick-film resistor acting as a piezo-resistive transducer and carried by the diaphragm on its surface facing the support, the diaphragm being able to deform resiliently towards the support when a pressure is exerted on its other surface, wherein the surface of the support which is connected to the diaphragm is flat, and wherein the layer of glue has a calibrated thickness such that the distance between the diaphragm and the surface of the support at rest is substantially equal to the deflection of the diaphragm corresponding to the predetermined maximum pressure measured whereby the diaphragm will contact and be supported by said support when subjected to the predetermined maximum pressure.

2. Pressure sensor according to claim 1, wherein the at least one thick-film resistor is deposited on the central zone of the diaphragm, and wherein the surface of the support defines a rebate in the region facing the at least one resistor whereby the resistor will not contact the support when the central portion of the diaphragm contacts said support.

* * * * *